June 10, 1930.  J. C. WRIGHT ET AL  1,762,942
MEASURING AND RECORDING DEVICE
Filed April 9, 1923   2 Sheets-Sheet 1
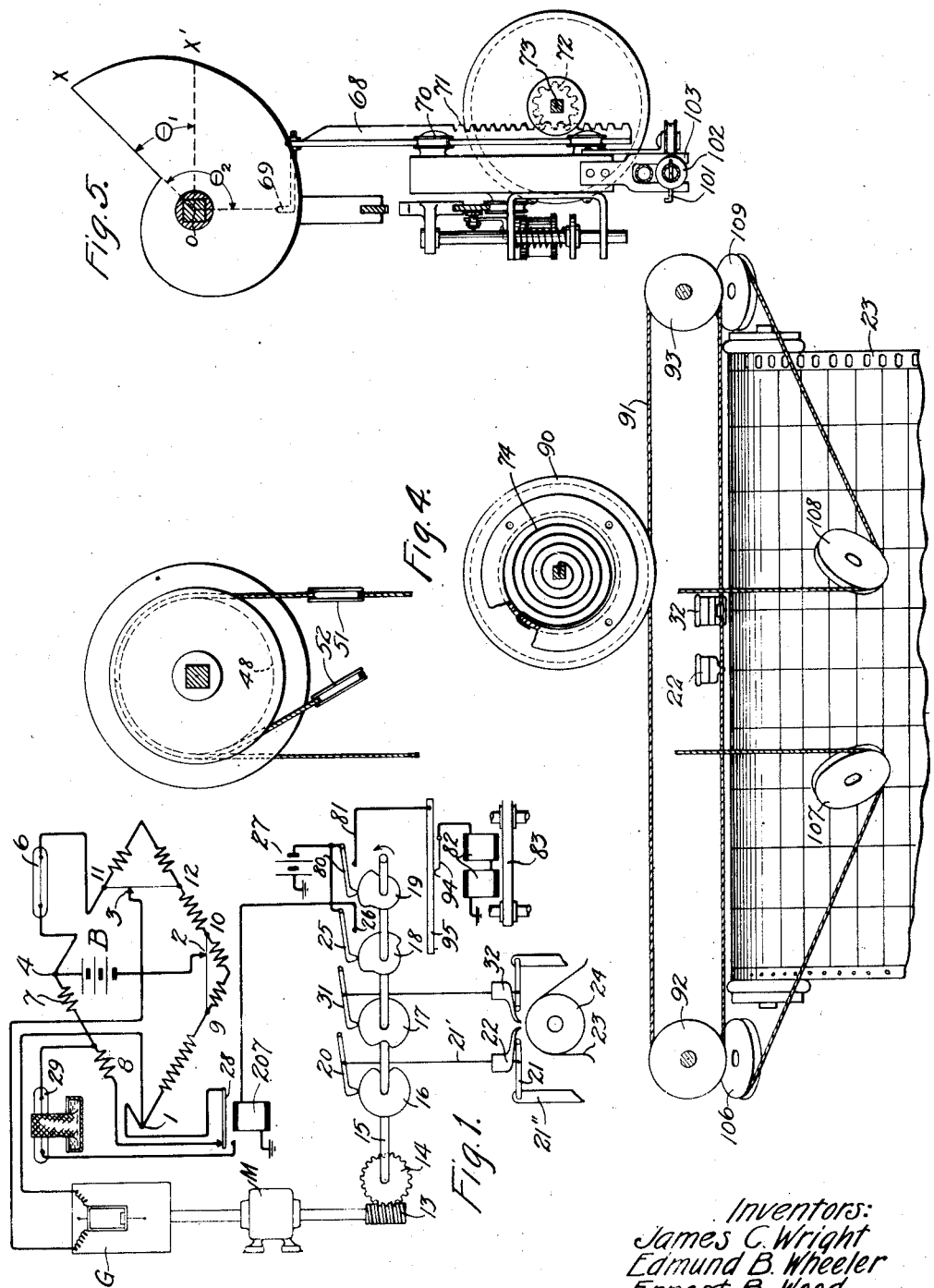
Inventors:
James C. Wright
Edmund B. Wheeler
Ernest B. Wood
by

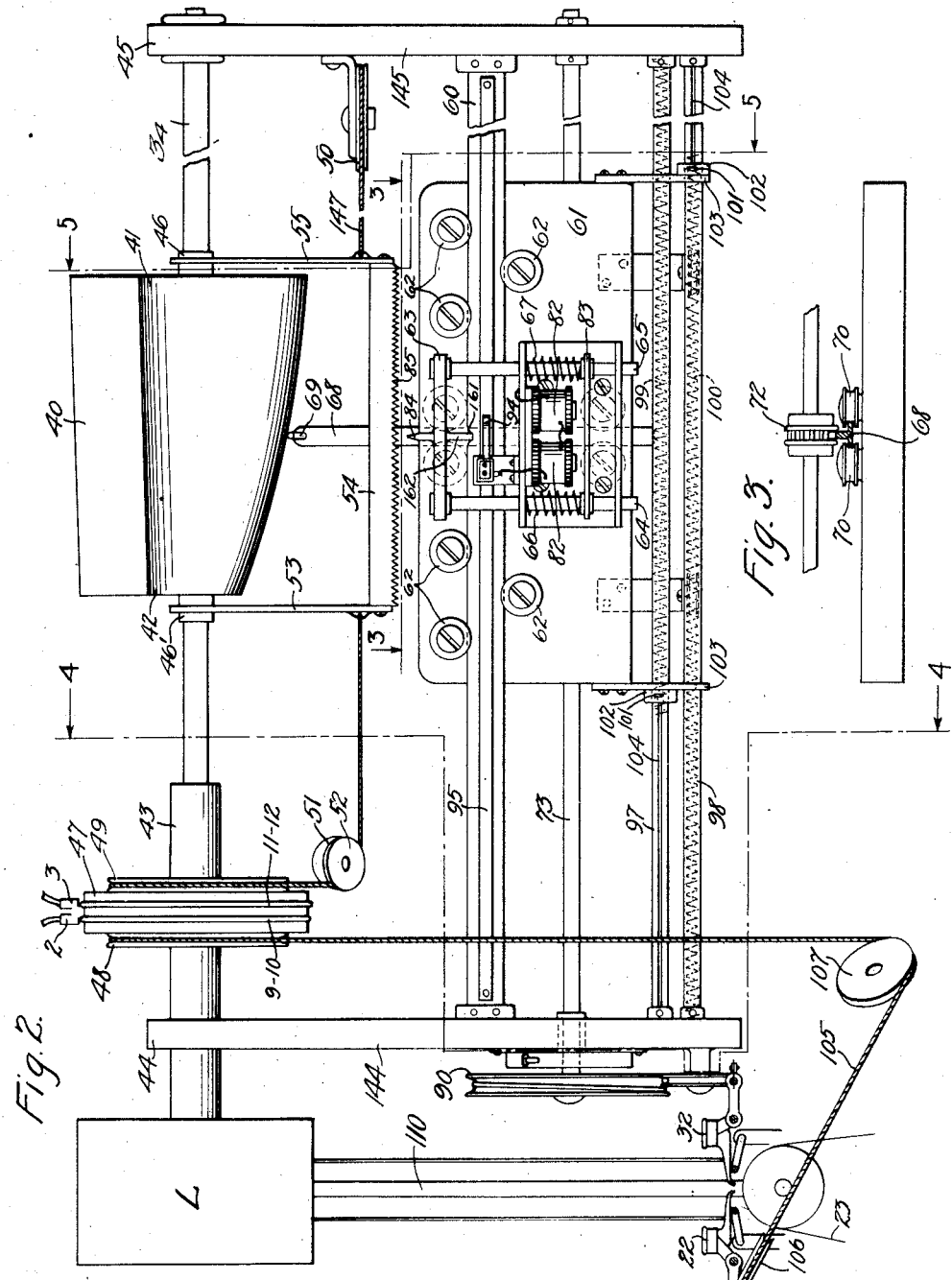

Patented June 10, 1930

1,762,942

UNITED STATES PATENT OFFICE

JAMES C. WRIGHT, OF MAPLEWOOD, NEW JERSEY; EDMUND B. WHEELER, OF NEW YORK, N. Y., AND ERNEST B. WOOD, OF CHATHAM, NEW JERSEY, ASSIGNORS TO WESTERN ELECTRIC COMPANY, INCORPORATED, OF NEW YORK, N. Y., A CORPORATION OF NEW YORK

MEASURING AND RECORDING DEVICE

Application filed April 9, 1923. Serial No. 630,811.

This invention relates to measuring and recording devices being particularly applicable to a device for continuously measuring and recording values of relative humidity.

The object of the invention is in general, to provide an apparatus for automatically measuring relative humidity and to provide means for recording the measured values, although in its broader aspects the invention is not limited to this application.

Values of relative humidity are usually determined by calculation from the readings of wet bulb and dry bulb thermometers which are exposed to the atmosphere. When it has been desired to obtain a record of relative humidity over a period of time, means have been provided for continuously recording the values of wet and dry bulb temperatures, but with such a record it is necessary to make numerous calculations and plot a third curve to show the variation in relative humidity. By means of the present invention, a curve of relative humidity is plotted directly in accordance with the variations in wet bulb and dry bulb temperatures.

The invention in its broad aspect consists in the provision of a measuring device employing means including a Wheatstone bridge for measuring the values of two quantities, and a translating mechanism positioned under control of said bridge for determining a third value which is a function of the two measured values. In the present embodiment of the invention, there is provided a specially shaped cam, the surface of which is plotted from the three coordinates, dry bulb temperatures, differences between dry bulb and wet bulb temperatures, and relative humidities the values of which may be taken directly from "Psychrometric Tables". This cam is associated with means for automatically and periodically measuring the two quantities, dry bulb temperature, and the difference between dry bulb and wet bulb temperatures. As these measurements are made the cam is automatically moved with relation to a pointer so as to position the pointer at the point on the surface of the cam which represents the value of relative humidity corresponding to the dry bulb temperature, and the difference between dry bulb and wet bulb temperatures. Connected to the pointer is an interpreting and recording mechanism which records the value of relative humidity.

Referring to the drawings: Fig. 1 is a schematic diagram showing the electrical system and the arrangement of the recording device; Fig. 2 is an elevation, partially diagrammatic, showing the mechanical construction of the mechanism; Fig. 3 is a fragmentary section taken on the line 3—3 of Fig. 2; Fig. 4 is a fragmentary section, partially diagrammatic, taken on the line 4—4 of Fig. 2; and Fig. 5 is a fragmentary section taken on the line 5—5 of Fig. 2.

Referring to Fig. 1, there is provided a Wheatstone bridge comprising arms 1—2, 2—3, 3—4, and 4—1, supply battery B and balancing galvanometer G. The arms 1—2 and 2—3 are composed of fixed resistances and portions of shunted slide wires as shown. Arm 3—4 comprises a portion of shunted slide wire 11—12, and a dry resistance thermometer 6 which may be of any suitable construction, although a resistance thermometer composed of a length of calibrated platinum wire has been found to be suitable. When relay 207 is in the non-operated position as illustrated, bridge arm 4—1, comprises fixed resistances 7 and 8. It is seen that as illustrated the Wheatstone bridge is arranged to measure the resistance of dry resistance thermometer 6, and hence a balance of the bridge will give a measure of dry bulb temperature. By means of power furnished by motor M and controlled by the deflection of galvanometer G, points 2 and 3 are moved along slide wires 9—10 and 11—12 respectively, to balance automatically the Wheatstone bridge. The mechanism for moving points 2 and 3 in response to the deflection of galvanometer G, forms no part of the present invention and hence a detailed description of this mechanism is not believed to be necessary. This mechanism is described in United States patent to Leeds No. 1,125,699, January 19, 1915.

Motor M operates at constant speed and by means of spiral gears 13 and 14, rotates at uniform angular velocity cam shaft 15 carrying cams 16, 17, 18 and 19, which are in the position shown when the Wheatstone bridge is being balanced to measure dry bulb temperature. During the period that the bridge is being balanced shaft 15 and cams 16, 17, 18 and 19, attached thereto, are being rotated as indicated by the arrow on Fig. 1. The setting of the gears and positions of the cams on the shaft are such that the bridge is balanced before the notch in cam 16 permits arm 20 to descend. In the position of the apparatus shown in Fig. 1, the wet bulb thermometer 29 is not included in the bridge so that the balance of the bridge prepares the apparatus to record dry bulb temperature. The bridge balancing mechanism is shown in Fig. 2 where 9—10 and 11—12 represent the slide wire resistances so designated in Fig. 1. To bring about a balance of the bridge, the drum 47 is revolved carrying with it pulley 48 over which passes cord 105. Through the medium of cord 105, pen 22 is moved along rod 21 to a position corresponding to bridge balance or dry bulb temperature. When lever 20 descends, it lowers pivoted rod 21 by means of the intermediate rod 21' and permits pen 22 to come in contact with record sheet 23, thus recording dry bulb temperature. As shaft 15 continues to rotate, lever 20 is again raised which in turn raises rod 21' thereby removing pen 22 from record sheet 23. At this time cam 18 has advanced to the point where the closure of contacts 25 and 26 is permitted thus energizing relay 207 over a circuit from grounded battery 27 through contacts 25 and 26 and relay 207 to ground.

With armature 28 in the operated position, bridge arm 4—1 comprises fixed resistance 7 and wet resistance thermometer 29. With this arrangement, the wet resistance thermometer and the dry resistance thermometer are in opposed arms of the bridge and hence a balance of the bridge will measure the difference between the resistance of the two thermometers, which gives a measure of the difference between the dry bulb temperature and wet bulb temperature. This quantity is a function of dry bulb temperature and relative humidity.

The bridge is automatically balanced as before and after sufficient time has elapsed to enable the bridge to be completely balanced, cam 17 allows lever 31 to descend momentarily, thus lowering recording pen 32 which makes a mark on the record sheet 23. Pen 32 is arranged in the same way as pen 22. During the time that the Wheatstone bridge was being balanced to measure dry bulb temperature and the difference between dry bulb and wet bulb temperature, a mechanism which will be described later, was in operation to position pen 32 in accordance with the value of relative humidity corresponding to the dry bulb temperature and the difference in temperature which were measured. Thus, the position of pen 32 with respect to the chart indicates directly the value of relative humidity; and the pen plots this value upon the chart.

After pen 32 has been raised from the chart, cam 18 separates contacts 25 and 26 thus allowing relay armature 28 to return to the non-operated position, which leaves the apparatus in its initial condition. Another cycle is immediately started and points are successively plotted upon record sheet 23 showing the dry bulb temperature and the relative humidity. Record sheet 23 is advanced by roller 24 at a uniform rate by means which will be described later.

Referring to Figs. 2 and 5, cam 40 is constructed with axial distances corresponding to dry bulb temperature; and each cross section taken in a plane perpendicular to the axis, represents a polar curve of relative humidity plotted as radii against the differences between a dry bulb temperature and various wet bulb temperatures plotted as angle $\theta$. Thus, for example, the end 41 of the cam corresponds to a definite dry bulb temperature and the profile of the end as shown in Fig. 5 is a polar curve of relative humidity plotted as radii against the differences between this dry bulb temperature and various wet bulb temperatures plotted as angle $\theta$. Suppose that end 41 of the cam corresponds to a temperature of 100° F. The radius vector OX represents 100% humidity and any other radius vector OX' of this curve, represents to the same scale the relative humidity corresponding to a dry bulb temperature of 100° F. and a difference in temperature represented by the polar angle $\theta_1$. Looking at the curve of Fig. 5 from a position in front of the paper, the angle $\theta$ progresses positively in a clockwise direction from the polar axis OX.

The cam is so shaped that on a cross-section taken in any plane parallel to end 41 the surface line of the cam will be a curve similar to the curve shown by the profile of end 41 in Fig. 5; and such a curve will be a polar curve of relative humidity for some definite dry bulb temperature, the curve being plotted with relative humidity as radii and difference between dry bulb and wet bulb temperatures as angle $\theta$. The dry bulb temperature will be given by the distance of the cross sectional plane from the end of the cam. For example, end 41 may correspond to a temperature of 100° F. and end 42 to a temperature of 40° F., in which case the length of the cam represents a scale of dry bulb temperatures from 40° F. to 100° F.

It is seen that this cam is so shaped that every point upon its surface corresponds to a value of relative humidity, and that values of humidity will be represented for all values of dry bulb temperature between the temperatures corresponding to end 41 and end 42 of the cam, respectively. By selecting a suitable scale of polar angles to represent the difference between dry bulb and wet bulb temperature, the surface of the cam may be made to represent humidity over any desired range of differences between dry bulb and wet bulb temperatures.

For any dry bulb temperature and any difference between dry bulb and wet bulb temperature within the range for which cam 40 is constructed, there may be selected one point upon the surface of the cam, the dry bulb temperature being given by the perpendicular distance of the point from the plane of one end of the cam, and the difference between dry bulb and wet bulb temperature being given by the angle $\theta$ (see Fig. 5). The radial distance of this point from origin 0 which is the center of shaft 34, gives directly the value of relative humidity.

The mechanism associated with the cam will now be described. A shaft having a round portion 43 and a square portion 34 is freely journaled at 44 and 45 in supporting frame members 144 and 145. The square portion of the shaft carries cam 40 which is slidable longitudinally of the shaft, but cannot rotate about it. Rigidly secured to the round portion 43 of the shaft is a drum 47 carrying pulleys 48 and 49 and slide wires 9—10 and 11—12 being the slide wires 9—10 and 11—12 shown schematically in Fig. 1. These slide wires may be of any suitable form, such as that disclosed in the patent to Leeds previously mentioned. Cooperating with the slide wires are contacts 2 and 3 which likewise are contacts 2 and 3 shown schematically in Fig. 1. The Wheatstone bridge is automatically balanced by rotating shaft 43 so as to vary the position of the slide wires with respect to contacts 2 and 3. This shaft 43 is rotated in accordance with the deflection of galvanometer G by means of the mechanism L which is that described in the Leeds patent.

A cord 147 is attached to depending arm 55 that is journalled freely on nipple 46, which projects from the end of cam 40. This cord passes over pulley 50 and a second pulley which is not shown to pulley 51, then passes completely around pulley 49 which is attached to drum 47 and then over pulley 52 and is attached to depending arm 53 which is freely journalled as shown on nipple 46', rigidly attached to end 42 of cam 40. Depending arms 53 and 55 are rigidly secured together as shown by means of saw tooth member 54.

It is seen that the arrangement of cord 147, pulleys 49, 50, 51, and 52, and depending arms 53 and 55 is such that cam 40 will be moved longitudinally along shaft 34 as drum 47 rotates. Thus, for any angular position of drum 47, cam 40 will have a definite longitudinal position on the shaft 34. Cam 40 in addition to moving longitudinally on the shaft with the rotation of drum 47, rotates through the same angle as drum 47 and hence for any given angular position of drum 47, cam 40 has a definite longitudinal and angular position.

Supported by frame members 144 and 145 is a track 60 upon which is mounted a carriage 61 by means of rollers 62 having flanges which project over the edge of the track. In the center of track 60 is a depression 161 that cooperates with a detent 162 which normally is held in the depression by means of bridge member 63 supported on reciprocating members 64 and 65. Members 64 and 65 are pressed down by coil springs 66 and 67. A rod 68 having a point 69 is mounted upon the back of the carriage by means of rollers 70, (Figs. 3 and 5) and is movable in a vertical direction. On the lower part of rod 68 there is formed a rack 71 which cooperates with a spur gear 72 slidably mounted upon square shaft 73. Shaft 73 is biased in a clockwise direction (Figs. 4 and 5) by means of helical spring 74 thus maintaining point 69 in contact with the cam 40.

With the apparatus in the position shown in Fig. 2, carriage 61 is locked against movement by means of detent 162 and depression 161 in track 60; and hence point 69 is only free to move in a vertical direction. When the mechanism of Fig. 2 is in the position shown, the electrical circuit has the arrangement shown in Fig. 1 which is the condition when the Wheatstone bridge is being balanced to measure dry bulb temperature. This means that when a balance is finally obtained, drum 47 will take up a definite angular position which is a measure of the dry bulb temperature; and since cam 40 assumes a characteristic longitudinal position on shaft 42 corresponding to the angular position of drum 47, the longitudinal position of cam 40 will correspond to the dry bulb temperature which is measured. The arrangement of cam 40 and pointer 69 is such that when the balance is obtained, pointer 69 is in contact with cam 40 in the cross sectional plane of cam 40 which represents the dry bulb temperature that has been measured.

Referring to Fig. 1, it will be seen that after the bridge has been balanced to measure dry bulb temperature, cam 19 advances so as to permit closure between contacts 80 and 81 thus completing a circuit from battery 27 through the winding of electromagnets 82 to ground and back to the battery. Electromagnets 82 of Fig. 1 are the same as electromagnets 82 of Fig. 2 which upon being energized attract armature 83, rigidly secured to reciprocating rods 64 and 65. The resultant elevation of rods 64 and 65 causes the disengagement of detent 162 with depression 161, and the engagement of knife edge 84 with the saw tooth edge 85 of member 54. This removes the rigid connection between the carriage 61 and track 60 and locks the carriage to member 54, so that in any further longitudinal movement of cam 40, carriage 61 will be moved with the cam, and thus there will be no relative longitudinal motion between point 69 and cam 40. When the carriage moves, rack 71 bears on a flange of spur gear 72, thus causing it to move with the carriage.

From Fig. 1, it is seen that the bridge is next connected to measure the difference between dry bulb and wet bulb temperature, which will result in drum 47 and cam 40 assuming an angular position that is a measure of the difference in temperature. This will cause cam 40 to assume a new longitudinal position upon shaft 34, but as carriage 61 travels longitudinally with the cam, pointer 69 will remain at the cross sectional plane of cam 40 corresponding to the dry bulb temperature which was measured immediately before. Angle θ (see Fig. 5) is proportional to the difference between dry bulb and wet bulb temperature, and since the pointer is in the proper cross sectional plane of the cam, it is apparent that the distance of the pointer from the center 0 measures directly the relative humidity, corresponding to the dry bulb temperature and the difference between wet bulb and dry bulb temperatures which has just been measured by means of the Wheatstone bridge.

For any given vertical position of pointer 69, there must be a definite angular position of shaft 73 which carries spur gear 72 cooperating with rack 71; and thus the angular position of shaft 73 is likewise a measure of the relative humidity. Shaft 73 carries a pulley 90 around which is passed a cord 91 passing over pulleys 92 and 93 and carrying recording pen 32 which is the same as pen 32 shown in Fig. 1. Pen 32 being positioned on chart 23 in accordance with the angular position of pulley 90, takes up a position on the chart which indicates directly the value of relative humidity. As indicated schematically in Fig. 1, lever 31 which is under control of mechanism L is lowered following the balance for difference in temperature, thus allowing the pen 32 to come in contact with the chart and plot a point which gives directly the value of relative humidity.

Connection to electromagnets 82 may be made in any suitable manner such as, for example, connecting the wire from one electromagnet to the framework as shown in Fig. 2 and connecting the other end of the wire to brush 94 which makes contact with a conducting strip 95 secured to, but insulated from, track 60. The lines over which the current is delivered to the electromagnet are then connected to any suitable point on the frame and to strip 95 respectively, and the longitudinal movement of carriage 61 will not interfere with the energization of magnets 82.

From Fig. 1, it is seen that after the bridge has been balanced for differences in temperature and the temperature and humidity have been recorded, cam 19 causes the separation of contacts 80 and 81 thus breaking the circuit which supplies the current to energize magnets 82. Passing between frame members 144 and 145 are tubes 97 and 98 containing helical springs 99 and 100, respectively. Each helical spring is attached by means of a pin 101 to a collar 102 which is adapted to engage bifurcated members 103 which depend from carriage 61. Tubes 97 and 98 are each provided with a slot 104 which extends as shown for a distance from the ends of the tubes. These slots are of such a length that each pin 101 is free to move from the end of the tube to such a point that its collar 102 will come in contact with bifurcated member 103 when the carriage is in the position in which detent 162 cooperates with depression 161.

Following the balance for difference in temperature and the recording of the relative humidity on chart 23, carriage 61 will in general, be in some position such that detent 162 is either to the left or to the right of depression 161. In either case, one of springs 99 and 100 exerts a returning force upon the carriage, the other spring not counteracting on the carriage on account of the fact that pin 101 lies against the end of slot 104. Upon the deenergization of magnets 82, springs 66 and 67 cause the disengagement of knife edge 84 with saw tooth edge 85 of member 54 thus allowing either spring 98 or 99, as the case may be, to move carriage 61 until detent 62 engages depression 61. This leaves the mechanism in the initial condition and free to start upon another cycle such as has just been described.

Pins 101 may advantageously be threaded into collars 102 so that they may be removed and placed between different turns of the springs in order to adjust their tension.

It is seen that the bridge is alternately and periodically balanced to measure dry bulb temperature and difference between wet bulb and dry bulb temperatures and in each case, drum 47 takes up an angular position corresponding to the value measured. Following the measurement of dry bulb temperature, drum 47 occupies an angular position corresponding to the dry bulb temperature and recording pen 22 is positioned with respect to chart 23 by means of cord 105 which is wound around pulley 48 and passes over pulleys 106, 107, 108 and 109. Pen 22 (see Fig. 1) is lowered momentarily following the measurement of dry bulb temperature and hence plots a point on the chart which gives the dry bulb temperature.

Chart 23 is advanced at uniform speed by means of any suitable mechanism such as the shaft 110 connected with the motor driven mechanism L; and since points are periodically plotted at frequent intervals giving dry bulb temperature and relative humidity, a record will be obtained upon which there are curves of dry bulb temperature and relative humidity plotted against time.

These curves may be plotted by means of this apparatus over an extended period of time without requiring the attention of an operator except to occasionally renew chart 23, refill pens 22, 32, etc. To facilitate the selection of values from the finished record, it is preferable that the chart be printed with two scales of ordinates, one for temperature and the other for humidity.

The invention claimed is:

1. In combination, means including a Wheatstone bridge for measuring the values of two quantities, and a translating mechanism positioned under control of said bridge for determining a third value which is a function of the two measured values.

2. In combination, means including a Wheatstone bridge for measuring the values of two quantities, a translating mechanism positioned under control of said bridge for determining a third value which is a function of the two measured values, and means for recording the determined value and the value of one of the measured quantities.

3. A humidity indicating mechanism comprising a single geometrical surface plotted in accordance with three variables defining humidity, dry bulb temperature and difference between dry bulb and wet bulb temperatures, and means cooperating with the surface to automatically indicate the value of relative humidity corresponding to values of dry bulb temperature and difference between dry bulb and wet bulb temperatures.

4. A measuring device comprising means including a Wheatstone bridge for periodically measuring the values of dry bulb temperature and the difference between the values of dry and wet bulb temperatures, and a translating mechanism positioned under control of said bridge for determining a third value which is a function of the two measured values, and means for recording the determined value.

In witness whereof, we hereunto subscribe our names this 5th day of April, A. D. 1923.

JAMES C. WRIGHT.
EDMUND B. WHEELER.
ERNEST B. WOOD.